J. G. McBRIDE.
Oil-Cup.
No. 221,929. Patented Nov. 25, 1879.
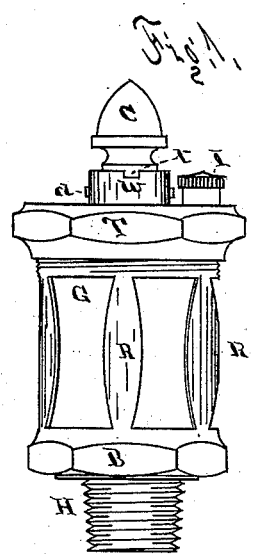
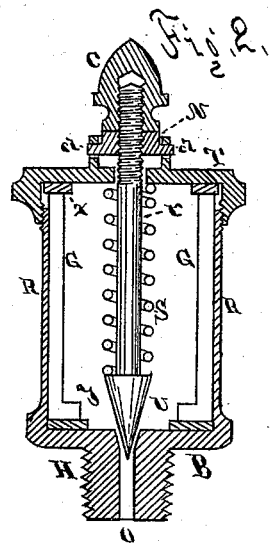
Witnesses
Elison V. Buckley
James Wilson
Inventor,
John G. McBride,
per Atty
A. S. Waterhouse,

UNITED STATES PATENT OFFICE.

JOHN G. McBRIDE, OF SACRAMENTO, CALIFORNIA.

IMPROVEMENT IN OIL-CUPS.

Specification forming part of Letters Patent No. 221,929, dated November 25, 1879; application filed August 27, 1879.

*To all whom it may concern:*

Be it known that I, JOHN G. McBRIDE, of the city of Sacramento, State of California, have invented a new and useful Improvement in Oil-Cups, of which the following is a specification.

The invention relates to that class of oil-cups used for lubricating purposes where a regular flow of oil is required of any desired quantity; and it consists of an internal valve regulated at the top of the oil-cup by means of a nut, provided with extending lugs arranged in a slotted sleeve.

In the accompanying drawings, Figure 1 is an elevation of an oil-cup embodying my invention. Fig. 2 is a sectional elevation of Fig. 1. Fig. 3 is a detail.

The exterior of the cup is composed of the bottom B, of which rim R is made a part; also the threaded shank H, used for screwing the cup to its bearing; also the top T, provided with nut C and glass tube G. The oil is inclosed by the top T, bottom B, and glass tube G. The bottom B is provided with a small bored aperture, $o$, that extends through shank H, through which the oil passes into the bearing. The top of the aperture $o$ is provided with a valve, $v$, in the form of an inverted cone, which closes the aperture when forced down, and permits oil to pass through $o$ when the valve $v$ is raised. So by adjusting the valve $v$ up or down any desired quantity of oil can be permitted to flow into $o$.

The valve $v$ is provided with a shank, $r$, which extends up through the top T. Around shank $r$ is a spiral spring, $s$, which presses down upon the valve $v$ and up against the top T, thus forcing the valve $v$ down and closing the aperture $o$. The top of the valve-shank $r$ is provided with two nuts, N and C. Nut C is used as a jam-nut to keep N from turning. The lower nut, N, is provided with two lugs, $a\,a$, (see Fig. 3,) and the top T is provided with a sleeve, $w$, which is provided with four longitudinal slots, consisting of the two opposite slots $t\,t$ and the two at right angle, in which the lugs $a$ are shown. The two slots in which the arms $a$ rest are made longer or lower down than the other two, so that it lets the nut N slip down with the shank $r$ and valve $v$ until the opening $o$ is closed, as shown in Fig. 2; and the two slots $t\,t$ are made short, so that when the nut N with the valve $v$ is drawn up, by taking hold of nut C and turning it one-quarter the way around, so that the lugs $a\,a$ will drop in the slots $t\,t$, the valve $v$ will be kept up from its seat at $o$, for the reason that the slots $t\,t$ are short and will not let the lugs $a\,a$ and nut N down far enough to cause the valve $v$ to close the opening $o$.

The top of the shank $r$ is provided with a slot for a screw-driver or other means of turning the shank $r$, so that it can be screwed up or down through the nut N, so that while the lugs $a\,a$ are in the short slots $t$ the valve will be opened enough to let through just the amount of oil required; and when the lugs $a$ are turned so as to be in the long slots, as shown, the valve will close the opening $o$ and shut the oil entirely off.

What I claim as new is—

The nut N, provided with lugs $a$, and the sleeve $w$, provided with longitudinal slots, in combination with the shank $r$, valve $v$, and spring $s$ in an oil-cup, substantially as and for the purposes set forth.

JOHN G. McBRIDE.

Witnesses:
ELISON V. BUCKLEY,
JAMES WILSON.